United States Patent
Fabiani

(10) Patent No.: US 7,029,135 B2
(45) Date of Patent: Apr. 18, 2006

(54) ROAD SIGN BAND AND MANUFACTURING METHOD THEREOF

(76) Inventor: Graziano Fabiani, Località Golfo Pero 198/a, Porto Cervo Arzachena (Sassari) (IT)

( * ) Notice: Subject to any disclaimer, the term of this patent is extended or adjusted under 35 U.S.C. 154(b) by 0 days.

(21) Appl. No.: 10/482,686

(22) PCT Filed: Jul. 30, 2001

(86) PCT No.: PCT/IT01/00417

§ 371 (c)(1), (2), (4) Date: Jun. 14, 2004

(87) PCT Pub. No.: WO03/005333

PCT Pub. Date: Jan. 16, 2003

(65) Prior Publication Data

US 2004/0212889 A1    Oct. 28, 2004

(30) Foreign Application Priority Data

Jul. 6, 2001  (IT)  .......................... BS2001A0056

(51) Int. Cl.
*G02B 5/128* (2006.01)
(52) U.S. Cl. .................................................... 359/536
(58) Field of Classification Search ................ 359/536, 359/538, 540, 552, 553
See application file for complete search history.

(56) References Cited

U.S. PATENT DOCUMENTS

| 2,543,800 | A | * | 3/1951 | Palmquist et al. | 359/538 |
| 3,936,567 | A | * | 2/1976 | Vesely | 359/536 |
| 4,388,359 | A | * | 6/1983 | Ethen et al. | 359/540 |
| 6,000,804 | A |   | 12/1999 | Kimura | |

FOREIGN PATENT DOCUMENTS

| EP | 0 346 021 A1 | 12/1989 |
| EP | 0 385 746 A  | 9/1990 |
| EP | 0 399 841 A2 | 11/1990 |
| WO | WO 00/23655  | 4/2000 |

OTHER PUBLICATIONS

Patent Abstracts of Japan, vol. 2000, No. 15, Apr. 6, 2001 & JP 2000 347014 A (Teikoku Printing Inks Mfg Co Ltd), Dec. 15, 2000 abstract.

* cited by examiner

Primary Examiner—Euncha P. Cherry
(74) Attorney, Agent, or Firm—Pearne & Gordon LLP

(57) ABSTRACT

Sign band (1) for day and night road signs, comprising a band-shaped support (6) having a first and second outer surface (6a) and 6b), a reflecting substance (7) arranged in a portion of at least one of said outer surfaces (6a) and (6b), a transparent gluing substance spread onto said reflecting substrace (7), and a plurality of transparent microspheres (9) anchored within said gluing substrate.

19 Claims, 2 Drawing Sheets

ROAD SIGN BAND AND MANUFACTURING METHOD THEREOF

TECHNICAL FIELD

The object of the present invention is a sign band, in particular for road signs, and a method for carrying out the same. In particular, the present invention relates to a sign band for both day and night road signs.

BACKGROUND ART

It is known about the presence on the market of a colored sign band made of plastic. Said band consists of a film with a thickness of about 0.1–1.5 mm, a height of few centimeters to a maximum of 10 cm, and a length varying from 10 to 200 meters according to its application.

This kind of sign band is commonly colored on both surfaces. The coloring is normally carried out by alternating white-colored areas with red-colored areas. Such areas are placed transversally with respect to the longitudinal development of the band, thus producing a peculiar two-color effect.

A sign band as described above is used by workers in the road field to indicate to other people the presence of an obstacle or to signal the presence of a dangerous situation. Such bands are normally used for road signs of various kinds, for instance along a roadway or to delimit and circumscribe a given area near which there is an obstacle or a danger, such as is the case for road works.

A sign band of the kind described above fully performs its function as a signaling device according to the visibility in the area between the beholder's position and the position of the two-color band.

In practice, the kind of two-color sign band available on the market is broadly used, in particular for night signs. However, the sign band belonging to the state of the art is not without disadvantages.

An important disadvantage consists in that a vehicle driver, for instance a car driver, can perceive the presence of a sign band placed in the direction of his/her visual field at a distance which can vary according to the visibility in the area between the vehicle driver and the sign band. That is why the distance at which a car driver perceives the presence of a sign gets shorter if visibility decreases or if the light surrounding him/her gets weaker. Particular conditions of insufficient visibility can also occur in the hours between dawn and sunset.

Several car drivers know that in case of weather conditions such as rain, fog and snow visibility along the driving direction can be highly reduced also at night. In such circumstances visibility can be difficult and many car drivers can find it hard to see before them a sign indicated by means of a simple two-color sign band at the state of the art.

In particular, a two-color road sign as described above can be hardly used and useful if placed along a roadway at night. All vehicle drivers indeed know that at night visibility on a roadway can be unsuitable to allow a driver to see an obstacle at a such a distance as to avoid it. As a matter of fact, the two-color sign band is used together with other lighting devices such as light source lamps.

A further disadvantage consists in that, when a sign band in red and white having the features described above is struck by a source of light, for instance "white" light, the rays of light going through the colored band are not reflected towards the source. Moreover, the light component striking the band is not amplified and is not reflected towards the source. In particular, in complete absence of visibility, when a sign band according to the state of the art is struck by a source of "white" light, no component of the incident light is simultaneously absorbed, amplified and reflected towards the source.

For instance a car driver illuminating with the lights of his/her car a two-color sign band will not see any component of reflected light. The absence of reflected light does not allow the car driver to see an obstacle signaled by means of a two-color band at the state of the art in complete absence of visibility. Consequently, the fact that a two-color sign band does not reflect light cannot favor its use for many applications. Therefore, there is the need on the market for a sign band without the disadvantages at the state of the art. In particular, there is the need for a sign band which can be used in any condition of visibility. More in particular, it is important to have a sign band for night and day road signs.

AIMS OF THE PRESENT INVENTION

The main aim of the present invention is therefore to provide for a sign band which can absorb, amplify and reflect light when struck by a ray of light.

Another aim of the present invention is to carry out a method for the production of a sign band which is particularly cheap and easy.

A further aim of the present invention is to provide for a sign band for road signs, particularly suitable to indicate the presence of obstacles and to delimit and circumscribe dangerous areas.

DISCLOSURE OF THE INVENTION

These aims and others which will be evident during the following detailed description have been reached by the Applicant, who has found it useful to produce a sign band whose main features are listed in the attached claims.

The sign band comprises a plurality of microspheres anchored onto at least a portion of a band-shaped support.

A second object of the present invention is a method for producing a sign band whose main features are listed in the attached claims of method.

BRIEF DESCRIPTION OF THE DRAWINGS

Further technical characteristics and the advantages of the invention will be explained in further detail with reference to the attached drawings, supplied to purely indicative and therefore non limiting purposes, where.

DESCRIPTION OF THE ILLUSTRATIVE EMBODIMENTS

Figure 1:
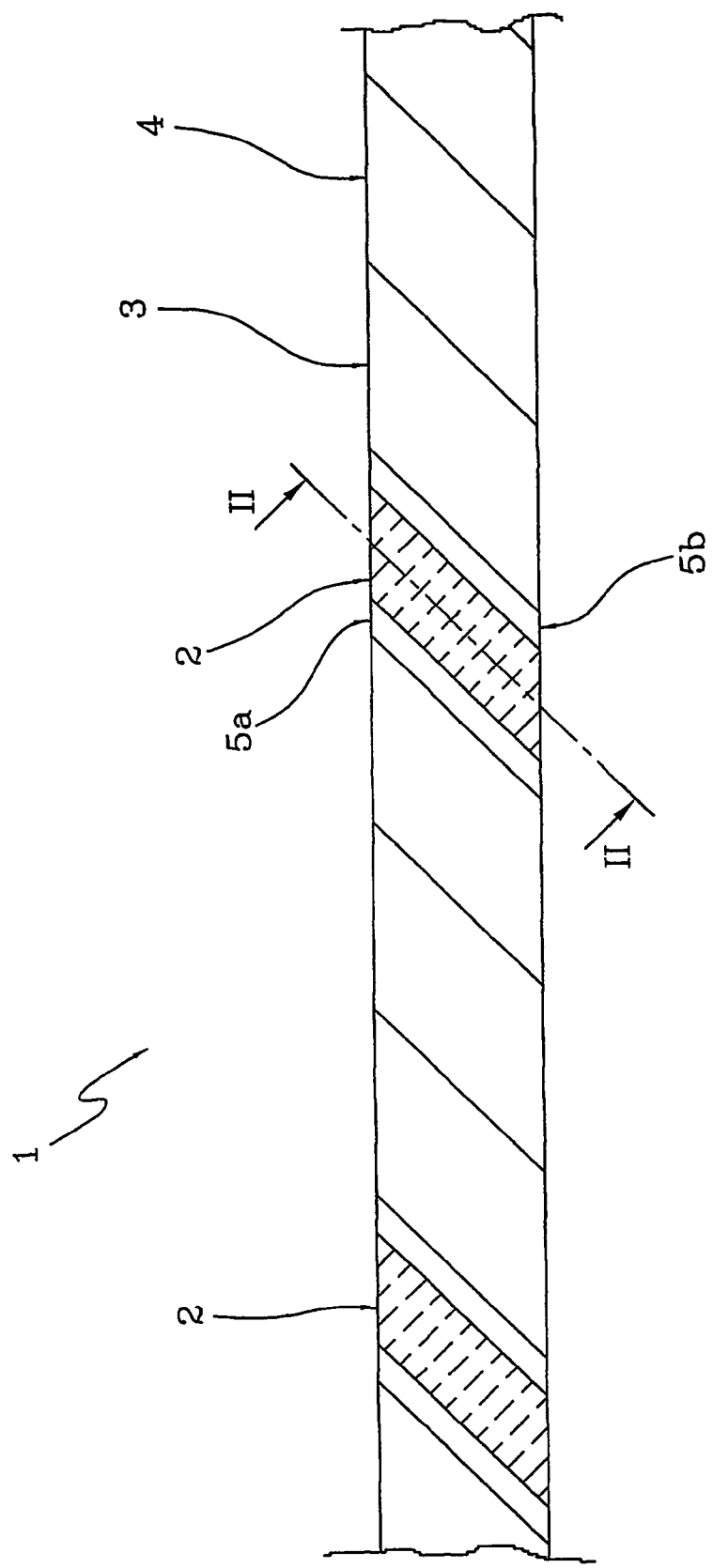
FIG. 1 is a schematic picture of a sign band 1 having some back-reflecting portions 2.

With reference to the attached FIG. 1, the sign band 1 can have back-reflecting portions 2 alternated with colored portions 3 and 4.

The back-reflecting portions 2 can also be defined as refracting portions in the context of the present invention. Moreover, the colored portions 3 and 4 can have the same color shade or different color shades.

For instance, the colored portions 3 and 4 can occupy the same surface area on the sign band 1 and can have the same geometric shape as well as, alternatively, they can have different sizes and shapes.

Preferably, the colored portions 3 and 4 are carried out using the colors which are known and conventionally used in this field, such as white, red, yellow and black.

Preferably, the back-reflecting portion 2 can be surrounded by a first area 5a and a second area 5b which are identical one to the other, though smaller that the colored portion 4. Moreover, it is preferable that said areas 5a and 5b are of the same color as the colored portion 4.

In a preferred embodiment the sign band shows in its length the repetition of a recurring pattern consisting of: a first area 5a, for instance in white; a refracting or back-reflecting portion 2, for instance in silver gray; a second area 5b, for instance in white; a colored portion 3, for instance in red; and a colored portion 4, for instance in white.

Figure 2:
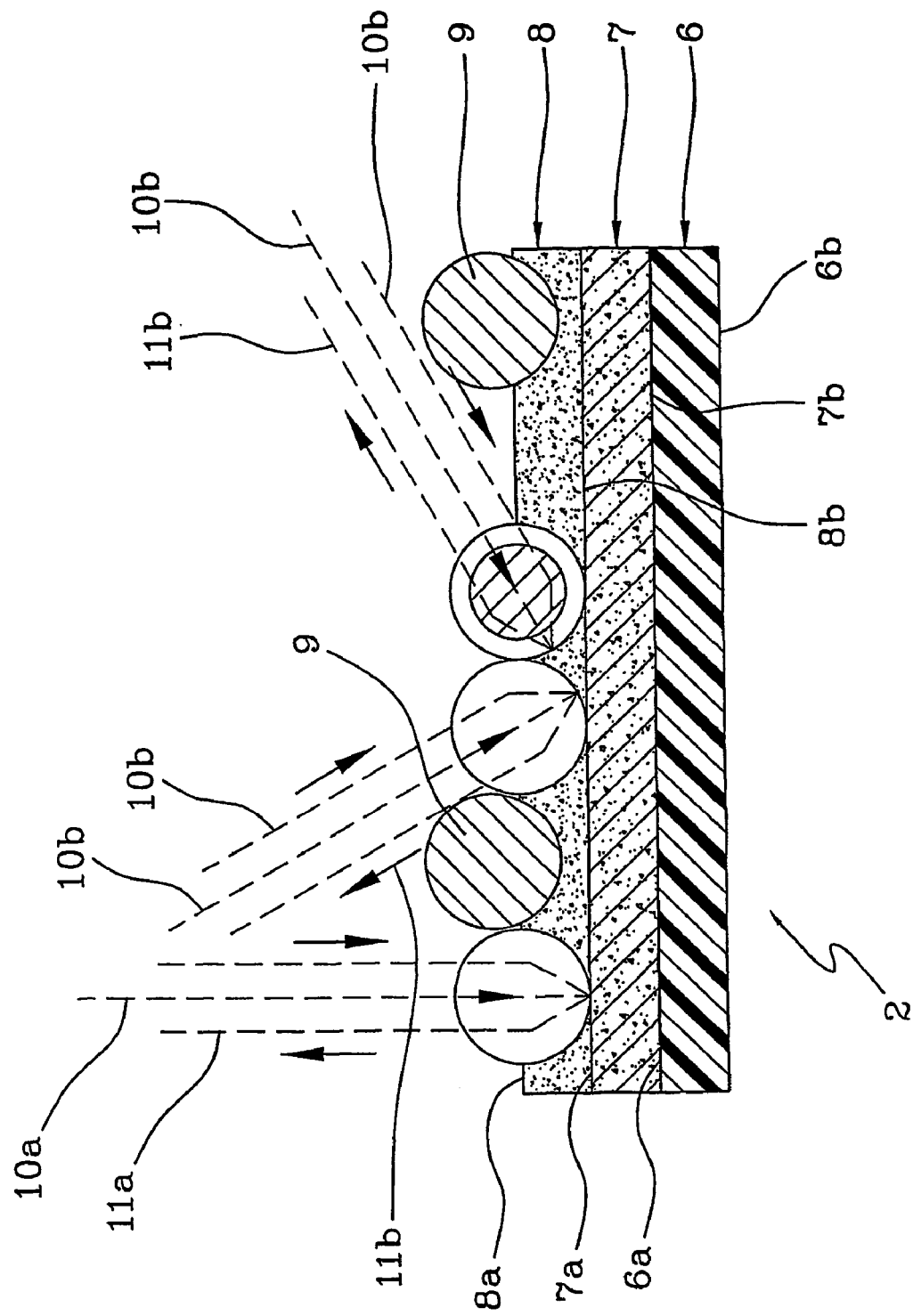
FIG. 2 shows a section view along line II—II in FIG. 1 of a back-reflecting portion 2.

With reference to the attached FIG. 2, the latter shows a section of the back-reflecting portion 2 carried out along section II—II in FIG. 1.

The back-reflecting portion 2 shows a band-shaped support 6 having a first and second outer surface 6a and 6b, respectively opposed one to the other. A reflecting substance, commonly known as reader, is placed on the outer surface 6a.

The layer of reflecting substance 7 shows an inner surface 7b and an outer surface 7a. The inner surface 7b is in direct contact with the outer surface of the band-shaped support 6a.

A gluing substance 8 is placed in direct contact with the outer surface of the layer of reflecting substance 7a.

The layer of gluing substance 8 shows an inner surface 8b and an outer surface 8a. The inner surface 8b is in direct contact with the outer surface of the layer of reflecting substance 7a.

A plurality of microspheres 9 is anchored within said gluing substance 8.

The process for producing a sign band 1 which is the object of the present invention comprises a series of stages here described in the following.

The first stage consists in positioning, by using conveying means or devices, a band-shaped support 6 near a printing device.

The band-shaped support 6 is made of olefin material, in particular it is a polyolefin material. The support 6 is placed in its length in a position adjacent to an outer surface of the printing device.

For instance, the printing device can be a mold having the shape of a cylinder with rotating drum, for instance of the kind which is commonly used in systems for flexographic print.

As an alternative spreading devices or spraying devices or devices for baren printing can be used.

The polyolefin support material is chosen among polyethylene, polypropylene, polybutylene and polyvinyl chloride (PVC).

Advantageously, the support material 6 is polyethylene. Preferably, said polyethylene is a mono- or bi-oriented polyethylene; more preferably, said mono- or bi-oriented polyethylene has low or high density.

From the practical point of view the band-shaped support 6 can have a height between for instance 1 millimeter and 20 millimeters, a thickness between for instance 5 and 500 micron and a length between for instance 10 and 500 meters.

As an alternative the band-shaped support 6 can have the same consistency as a polyethylene film.

The band-shaped support 6 has a first and second outer surface 6a and 6b, respectively opposed one to the other.

The printing device, for instance a cylinder for flexographic print, shows on its outer surface a photoengraved cliché (photopolymeric cliché).

At the end of the first stage the band-shaped support is placed in a position adjacent to the printing device, in particular in contact with a photoengraved cliché.

In the second stage of the process a reflecting substance 7 is spread onto a portion of at least one of said outer surfaces 6a and 6b.

Preferably, said reflecting substance 7 is contained in a containing device.

In case a cylinder for flexographic print is used, the latter is partially immersed within said reflecting substance 7. The cylinder rotation, for instance around its main axis, allows to spread the reflecting substance, a paint for instance, contained in the containing device onto a portion of at least one of the two outer surfaces 6a and 6b of the support 6.

Advantageously, the physical status of the reflecting substance 7 is liquid or liquid-viscous.

For instance the reflecting substance 7 is a viscous transparent dispersion.

Preferably, said reflecting substance 7 is a paint soluble in water and in alcohol.

Advantageously, said reflecting substance 7 comprises at least a flexographic coloring agent, which is commonly used in processes of flexographic print.

Preferably, said flexographic coloring agent, commonly known as reader, is a flexographic coloring agent for printing polyethylene.

From the chemical point of view a flexographic coloring agent comprises the following components:
- at least a binder, preferably chosen among nitrocellulose and a polyurethane resin;
- one or more pigments or coloring substances;
- one or more fillers;
- at least a solvent preferably chosen among ethyl alcohol, isopropyl alcohol, ethyl acetate and ester of monopropylene glycol; and
- at least an additive preferably chosen among waxes, plasticizers and antifoam solutions.

Advantageously, said reflecting substance 7 contains silver gray, aluminum gray and gold yellow pigments or coloring substances.

Preferably, said reflecting substance 7 is spread onto the support in polyolefin material 6 as a thin layer.

The layer of reflecting substance 7 will then have an inner surface 7b and an outer surface 7a.

The inner surface 7b of the layer 7 will be in direct contact with the outer surface of the support 6a.

The reflecting substance 7 can be partially spread onto said first surface 6a of said support 6 in polyolefin material and then onto the second surface 6b opposed to said first surface 6a.

As an alternative the reflecting substance 7 can be simultaneously applied onto both surfaces 6a and 6b.

The reflecting substance 7 should be soft, flexible and should not stiffen when the solvent evaporates.

Moreover, the reflecting substance 7 is chosen so that it does not cause any problems due to opacification, oxidation and crystallization.

The opacification and oxidation of the reflecting substance 7 reduce the brilliance and the degree of reflection of pigments and/or coloring substances which are present in the reflecting substance 7.

Moreover, the crystallization of the reflecting substance 7 should provoke or simplify the detachment of the reflecting substance 7 from the polyolefin film.

The coloring substances used in the processes of flexographic print contain pigments or parts of material with a high coefficient of brilliance and of light reflection. For instance, a flexographic coloring agent can contain some components, in solid form for instance, which are highly reflecting.

Such components can be assimilated with finely divided metal parts and can be in form of microparticles, powders and granules such as fragments of colors similar to gold, silver, aluminum. Metal materials are characterized in that they are brilliant, such as aluminum, silver and others.

Preferably, the color used in conditions of night visibility is silver gray and gold yellow.

The brilliance of a material is related to its capacity of reflecting incident light.

The object of the present invention comprises a sign band 1 obtained from a band-shaped support 6 in polyolefin material comprising a reflecting substance 7, whatever the method used to apply said reflecting substance 7 onto or into the band-shaped support 6.

By using conveying means or devices the band-shaped stripe in polyolefin material, coming from the stage in which the reflecting substance 7 is applied, is conveyed towards a suitable device for a gluing stage.

Another stage of the process which is the object of the present invention comprises the addition of a transparent gluing substance 8 onto said reflecting substance 7.

As an alternative the reflecting substance 7 and the gluing substance 8 can be mixed together in variable percentages and then applied onto the support 6.

Preferably, the gluing substance 8 is contained in a containing device and is applied onto the band-shaped support 6 for instance by using a cylinder with rotating drum as described above.

As an alternative spreading devices or spraying devices or devices for baren printing can be used.

The gluing substance 8 is added onto said reflecting substance 7, preferably in direct contact with the reflecting substance 7.

Preferably, the layer of gluing substance 8 applied onto the polyolefin support 6 is between 1 and 200 micron, more preferably between 10 and 100 micron.

The gluing substance 8 used in the processes of flexographic printing is chosen among gluing substances which do not have too high a "gluing" or "adhesive" quality.

For instance, in case a cylinder with rotating drum having a photoengraved cliché on its outer surface is used as printing device, the gluing substance 8 which is present at first on the cliché should be completely transferred onto the surface of the polyolefin material. If the gluing substance is too viscous and therefore too adhesive, the transfer of the gluing substance (8) from the cliché to the polyolefin material is not complete, and as a consequence, after some applications the cliché is saturated with the gluing substance (8).

Preferably, said gluing substance 8 is applied onto said band-shaped support 6 as a thin layer.

The layer of gluing substance 8 has an inner surface 8b and an outer surface 8a.

The inner surface 8b of the gluing layer 8 is in direct contact with the support material 6 including the reflecting substance 7.

Alternatively, the inner surface 8b of the gluing layer 8 is in direct contact with the outer surface of reflecting substance 7a.

Preferably, said gluing substance 8 comprises a substance with self-adhesive properties.

Preferably, from the chemical point of view the self-adhesive substance is an acryl substance self-reticulating with recyclable solvents.

The gluing substance can be diluted in solvents chosen among: ketones, aliphatic hydrocarbons, aromatic hydrocarbons and esters.

Preferably, the gluing substance 8 could be a monocomponent acryl resin or, alternatively, a silicone resin.

Advantageously, the gluing substances used show the following technical characteristics:

transparent and/or colorless substance, viscosity (calculated with method MC2007) between 2,000 and 4,000 mPa.s; peel adhesion 850±150 g/cm; shear adhesion 500–1,000 hours and rolling ball tack (calculated with method MC5001) 13±2 cm.

Preferably, the physical status of the gluing substance 8 can be liquid or solid in dispersed form.

The gluing substance 8 has, among other things, the function to maintain the brilliance of the materials with a high coefficient of brilliance and reflection of the reflecting substance 7.

The layer of reflecting substance 7 containing particles or microparticles, for instance of aluminum or silver, is sealed on one side by means of the band-shaped support 6, and on the other side with a layer of gluing substance 8.

In such conditions said materials cannot be oxidized by oxidizing agents such as oxygen or atmospheric agents.

Oxidation would cause a high reduction of the degree of brilliance and reflection of the materials/pigments contained in the reflecting substances 7.

Preferably, the adhesive should not be completely dry since the presence of solvent traces simplifies the reticulation of the gluing product, thus creating self-adhesive substances having higher technical characteristics than the foreseen standard.

The gluing substance 8 can be partially applied onto said first surface 6a of said polyolefin material and then onto the second surface 6b opposed to the first one.

Alternatively, the gluing substance 8 can be simultaneously applied onto both surfaces 6a and 6b.

By using conveying means or devices the band-shaped support 6, coming from the gluing stage, can then be conveyed towards a device for supplying microspheres. Said device spreads a plurality of transparent microspheres 9.

Preferably, said microspheres 9 are made of a glass material with a high index of refraction, or anyway of a transparent material through which rays of light can easily pass without any component of spurious light.

The supplying device proportions the microspheres 9 so as to regulate the amount and stratification of the microspheres 9 on the band-shaped support 6. Said microspheres 9 are proportioned so as to recycle possible microspheres 9 in excess. The microspheres 9 are placed in contact with said transparent gluing substance 8 thus forming a thin uniform layer.

The microspheres used in the production of the sign band 1 which is the object of the present invention are anchored to the film of polyethylene material 6 previously treated with the gluing solution 8 in order to allow said microspheres to penetrate into the gluing solution 8 and to fix onto the film in a definitive way.

Preferably, said microspheres 9 have a diameter between 1 and 1,000 micron, more preferably between 10 and 100 micron.

Advantageously, in this stage it is important that the microspheres 9 are arranged in such a way as to fill the surface of the band-shaped support 6 as much as possible. The maximum filling condition is obtained by suitably choosing the diameter of the microspheres 9.

Too short a diameter does not provide the polyolefin material with a sufficient consistence, whereas too long a diameter can cause empty unfilled portions.

The sign band 1, as designed by the Applicant, works as a back-reflecting system with amplified light.

A source of light (not shown in FIG. 2) is directed towards the sign band 1. The incident light 10 is represented by a component of perpendicular incident light 10a and by a component of angular incident light 10b. The components of light 10a and 10b strike, as shown in FIG. 2, the sign band 1 and go through the transparent microspheres 9 anchored onto the gluing layer 8.

The components of light 10a and 10b can then go through the layer of gluing substance 8.

The components 10a and 10b which can go through the layer of gluing substance 8 strike the reflecting substance 7 containing microparticles with a high degree of brilliance.

The incident light 10 is reflected (reflected light 11) in the opposite direction with respect to the direction of incidence, i.e. outwards in all directions. The incident light 10 on the sign band 1 can thus be amplified and highly back-reflected, for instance as far as 300 meters.

This characteristic allows to use the sign band 1 which is object of the present invention for night signs, in particular for road signs.

Moreover, the sign band 1 can be used in conditions of low visibility for day signs since it is also fluorescent.

Polyethylene is very cheap and has chemical, physical and mechanical characteristics, such as for instance a low tendency to crystallize at low temperatures, which allow said material to be used in processes of flexographic print.

A preferred embodiment of the present invention provides that the sign band 1 is protected against external agents, for instance against atmospheric agents.

In said embodiment the sign band 1 is coated with a membrane or with a thin film of light-transparent polyolefin material.

The embodiment providing for the coating of the sign band 1 which is the object of the present invention with a membrane or a transparent polyolefin film shows a longer life and a higher resistance to sun rays with respect to the same sign band which has not been coated with the protective layer.

What is claimed is:

1. Sign band (1), in particular for road signs, comprising a band-shaped support (6) having a first and second outer surface (6a) and (6b), respectively opposed one to the other, wherein said bandshaped support (6) comprises:
    a reflecting substance (7) placed in a portion of at least one of said outer surfaces (6a) and (6b);
    a transparent gluing substance (8) spread onto said reflecting substance (7); and
    a plurality of transparent microspheres (9) having a diameter comprised between 10 and 100 micron anchored within said gluing substance, wherein said microspheres emerge partially from said gluing substance, wherein one of said outer surfaces of said band-shaped support is uncovered.

2. Band according to claim 1, in which said support is a polyolefin material.

3. Band according to claim 2, in which said polyolefin material is polyethylene.

4. Band according to claim 1, in which said reflecting substance (7) is contained within said band-shaped support (6).

5. Band according to claim 1, in which said reflecting substance (7) is arranged in layers onto said band-shaped support (6).

6. Band according to claim 1, in which said reflecting substance (7) comprises pigments having a high coefficient of reflection to light.

7. Band according to claim 1, in which said gluing substance (8) comprises an acryl compound with adhesive properties.

8. Band according to claim 1, in which said microspheres are made of a glass material with a high index of refraction.

9. Method for producing a sign band (1) according to claim 1, wherein it comprises the following stages:
    positioning a band-shaped support (6) having a first and second outer surface (6a) and (6b), respectively opposed one to the other, near a printing device;
    spreading a reflecting substance (7) onto a portion of at least one of said outer surfaces (6a) and (6b);
    applying a gluing substance (8) onto said reflecting substance (7);
    supplying a plurality of transparent microspheres (9) having a diameter comprised between 10 and 100 micron wherein said method comprises the further stage of anchoring said microspheres onto the gluing substance allowing them to emerge partially from said gluing substance wherein, one of said outer surfaces of said band-shaped support is uncovered.

10. Method according to claim 9, in which said band-shaped support is a polyolefin material.

11. Method according to claim 10, in which said polyolefin material is polyethylene.

12. Method according to claim 9, in which said reflecting substance (7) comprises pigments having a high coefficient of reflection to light.

13. Method according to claim 9, in which said gluing substance (8) comprises an acryl compound with adhesive properties.

14. Method according to claim 9, in which said microspheres are made of a glass material with a high index of refraction.

15. Band according to claim 1, wherein said reflecting substance is in direct contact with said band-shaped support.

16. Band according to claim 1, wherein said reflecting substance is placed periodically along said band-shaped support.

17. Band according to claim 1, said band having different colored sections spaced periodically along said band.

18. Band according to claim 1, said band having a white section on each side of the section on which said reflecting substance is placed.

19. Band according to claim 1, said band having a length of 10 to 500 meters.

* * * * *